United States Patent Office 3,830,880
Patented Aug. 20, 1974

3,830,880
DIENE BLOCK COPOLYMERS
Harold E. De LaMare, Houston, Tex., assignor to
Shell Oil Company, Houston, Tex.
No Drawing. Continuation-in-part of abandoned application, Ser. No. 130,796, Apr. 2, 1971. This application May 14, 1973, Ser. No. 360,275
Int. Cl. C08d 1/20, 3/04, 3/06
U.S. Cl. 260—879
9 Claims

ABSTRACT OF THE DISCLOSURE

A process is provided for making an all-diene block copolymer by (1) forming a conjugated diene polymer block having more than about 25% 1,2 or 3,4 microstructure by polymerizing a conjugated diene using monofunctional organolithium initiator in the presence of a polar compound selected from the group ethers, thioethers, tertiary amines and hexa alkyl phosphoramides, then (b) adding a complexing agent, such as dialkyl zinc, selected from the group dialkyl and diaralkyl compounds of metals of Group II of the Periodic Table, to nullify the effects of the polar compound, and then (c) forming a conjugated diene polymer block having a lower 1,2 microstructure. The products are useful as elastomers, and may be vulcanized, if desired.

---

This is a continuation-in-part application of copending application Ser. No. 130,796, filed Apr. 2, 1971, now abandoned.

BACKGROUND OF THE INVENTION

This invention is concerned with the production of block copolymers. More specifically, it is concerned with the preparation of block copolymers solely from conjugated dienes by an improved process.

The art of preparing block copolymers has developed rapidly in the last few years. Generally, block copolymers are prepared using organolithium compounds as initiators by forming an inelastic living polymer block from a monoalkenyl arene monomer, then polymerizing in succession an elastomeric block made from a conjugated diene and then a second inelastic monoalkenyl arene block. In this sequential method, each monomer is consumed before adding the next one and the product is recovered by coagulation or precipitation. Alternatively, the living polymer may be joined to itself or to another species of living polymer using coupling agents such as dihaloethanes or esters of carboxylic acids, depending on the need for a linear or multi-branched structure, and then recovered.

The hydrocarbon block polymers of this type are usually thermoplastic and may be elastomers or near-plastics depending on the chemical identity of the several blocks, the individual block molecular weights, the ratio of the different species of blocks and the total molecular weight.

In these anionic block copolymers, the prior art teaches that diene molecules may enter the growing polydienyl lithium chain in several ways to produce cis and trans 1,4 microstructures and 1,2 (vinyl) microstructure. Isoprene and other substituted diene molecules can enter in a 3,4 configuration as well as in the 1,4 configuration, but the percentage in the 1,2 configuration is usually very small. Thus, the unsaturation in the polymer may be present either in the main chain or in short vinyl or isopropenyl side chains. By polymerizing a diene in an inert hydrocarbon solvent, a polymer block low in 1,2 content but high in total 1,4 content is formed. When a polar substance such as an ether or a tertiary aliphatic amine is present, entering diene monomer molecules are forced into the 1,2 microstructure, the extent depending on the quantity of polar substance added. By adjusting conditions and selecting the proper diene monomer, polymer blocks having as high as 85–90% 1,2 or 3,4 microstructure of 90–92% 1,4 microstructure can be obtained. The various microstructures may be determined by infrared analysis or by nuclear magnetic resonance spectrometry.

U.S. Pat. 3,140,278 to Kuntz discloses an earlier method for preparing diene block polymers, controlling the microstructure in one block by solution polymerization in the presence of ethers. When the initial block is formed, the ether is removed by vacuum stripping such as by the application of reduced pressure and heat if necessary. A second portion of the diene monomer is then injected and polymerization continued to form a second diene polymer block having a microstructure which is different from that of the first block. The disadvantage of the stripping step will be evident to experts in that stripping is never complete and most certainly is an economic necessity placed on the process. Consequently, any means of avoiding the stripping step while at the same time controlling microstructure in diene block polymers would be desirable both economically and technically.

The physical properties of diene polymer blocks depend to a great degree on the frequency of small side chain branching present on the main polymer chain. Methyl side chains usually arise from methyl groups present in the original diene, as from polymerization of isoprene. Elastomeric quality, resilience, tensile strength, glass point, crystallizability and other properties contributed by any polymer block depend strongly on the frequency of side chains on the main backbone chain. Therefore, in order to achieve the product properties desired, it is essential to exert strict control over polymerization conditions while polymerizing diene polymer blocks.

U.S. 3,278,508 to Kahle et al. describes a process for making a diene homopolymer having reduced inherent viscosity by solution polymerization in the presence of certain metallic adjuvants. Among the many alternatives stated throughout this patent is the possibility that the adjuvants may be added to the polymerization mixture in a polar solvent, otherwise there is no stated purpose for the presence of the polar solvent and moreover, other than reducing inherent viscosity there is no stated reason for the presence of the adjuvants. The patent makes no reference to block polymer polymerization, patricularly to block copolymers of diene blocks having variable and controlled microstructure.

OBJECTS OF THE INVENTION

It is an object of this invention to provide a novel process to prepare unsaturated block copolymers solely from conjugated dienes. It is a special object of this invention to provide an improved method of controlling the microstructure of block copolymers made entirely from conjugated dienes. Other objects will become apparent during the following detailed description of the invention.

STATEMENT OF THE INVENTION

Now, in accordance with the invention, a process is provided for preparing a conjugated diene block copolymer comprising the steps of (1) forming a polymer block that has more than 25% 1,2 or 3,4 microstructure from a conjugated diene using an organo-lithium compound in the presence of a polar compound of the group consisting of ethers, thioethers, hexa alkyl phosphoramides and tertiary amines; (2) then adding a special complexing agent to nullify the effect of the polar compound; (3) then forming one or more polymer blocks that have substantially lower 1,2 or 3,4 microstructure from the same or a different conjugated diene, or mixtures thereof.

The unsaturated block copolymer produced by the process of this invention has no monovinyl arene polymer blocks as such, although minor amounts of monovinyl arene may be present incidentally in one or more of dienes used without departing from the scope of the invention. Thus, the desirable properties in the novel block copolymers arise from their special aliphatic substructures.

The unsaturated block copolymers of this invention usually have one of several general formulas:

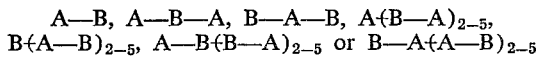

wherein each A and B are polymer blocks made from the same conjugated diene, or from different conjugated dienes, the conditions of polymerization being adjusted so that the A polymer blocks have a low 1,2 or 3,4 microstructure and the B polymer blocks have moderate to high (more than 25%) 1,2 or 3,4 microstructure, the balance of each A or B blocks being 1,4 structured.

The term 1,2 microstructure includes the term 3,4 microstructure in this application and claims, since usually the two types have the same effect on polymer physical properties and the methods of producing the two structures are the same.

The A and B blocks may be produced from the same diene to produce a heteroblock homopolymer, that is, a polymer made entirely from one monomer but with blocks of different structure, or the blocks may be made from different dienes or from mixtures of dienes, to produce a block copolymer. In this application, both types of polymers are included in the term block copolymer.

Where at any point in the above general formulas two identical A or B blocks are directly connected, except possibly for the residue of a coupling agent, the connected blocks are considered to be a single block for the purpose of describing molecular weights, responses to hydrogenation and the like. Branched structures or linear configurations may be produced by coupling living two-block copolymers or sequential polymerization. For example, where a tetrafunctional coupling agent such as silicon tetrachloride is used the structure would be represented by

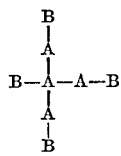

In the latter instance, any residue of a coupling agent has been ignored as being an insignificant part of these formulas for high molecular weight polymers.

In preparing diene polymer blocks using monofunctional organolithium initiators the extent of 1,2 or 3,4 microstructure is synonymous with the extent of side chain branching. Side chain branching in the polymer block. With more side chains present, a particular segment of polymer in a diene polymer is not as free to move as it would be with fewer side chains present, and that particular segment is therefore less elastomeric and freezes to immobility sooner when the polymer is cooled; that is, its glass temperature is higher and its resilience (rubberiness) at room temperature is lower.

The average moleclular weights of the A polymer block may be between about 3,000 and about 50,000, the preferred range being 7,000 to 30,000. The B polymer blocks may have average molecular weights from about 20,000 to about 200,000 but a range of 35,000–100,000 is preferred. The percentage of A blocks may be from 5% to about 80% of the total weight of the block copolymer.

Conjugated diene monomers suitable for making polymers according to this invention are those dienes having four to eight carbon atoms per molecule. Examples are butadiene, alkyl substituted butadienes such as isoprene, 2,3-dimethylbutadiene, piperylene and the like. Butadiene and isoprene are particularly preferred. These diene monomers may contain minor amounts of monovinyl arene monomers or other copolymerizable monomers, but will still be useful in the present invention. Mixtures of dienes are contemplated to achieve special properties.

Solution polymerization is preferred to make the polymers by the novel polymerization process now to be described, using lithium based catalysts that are monofunctional, for example, lithium alkyls. The diene monomer is dissolved in an inert solvent, such as an alkane, alkene, cycloalkane, cycloalkene or an aromatic solvent, as well as their mixtures. These solvents are exemplified by butene, butane, pentane, cyclopentene, cyclopentane, benzene toluene, xylene and the like.

Anaerobic conditions are essential and reactive impurities must be removed from both the highly purified monomer and solvents, using methods known to the art. Before adding monomer to the solvent, a quantity of organolithium compound, such as secondary butyl lithium, sufficient to cause polymerization to a polymer block of appropriate molecular weight, and a quantity of a polar compound, exemplified by tetramethylethylene diamine that is believed to complex with the lithium ion, are added to the reaction vessel. The monomer is then introduced and polymerization ensues until the diene monomer is consumed to form a polymer block of moderate to high 1,2 content, depending on the amount of tetrahydrofurane or other polar substance present. Then a second complexing agent, exemplified by zinc diethyl, is added. It is not necessary to remove the polar substance by distillation or other means, because its effect is nullified by reaction with the second complexing agent. When the next diene monomer is added or polymerization is continued with the same monomer, the next polymer block produced will be low in 1,2 content, since propagation of the active polydienyl lithium system now proceeds as if in a hydrocarbon solution to produce mostly cis 1,4 plus trans 1,4 structure. The addition of the complexing agent to nullify the effect of polar substances on microstructure produced during polymerization is the essence of the present novel process.

The two-block polymer is still active at this point, since it has a polydienyl lithium terminus, so that unless it is desired to recover the two-block polymer, it may be coupled using suitable coupling agents known to the art, such as dihaloethanes or certain carboxylic acid esters or silicon tetrachloride. Alternatively, polymerization of the two-block polymer may be continued by adding another diene monomer. If desired, additional amounts of polar substances may be added before a third block is formed. The amount of polar substance then present is larger than the quantity that the second complexing agent can react with, and the newly entering monomer will therefore be directed again into the 1,2 configuration. A particular and one of the preferred modes of operation in the present invention when only one diene is to be used involves adding at the beginning of polymerization all the diene and all the initiator required to produce all the desired polymer blocks. The changes from one configuration to another in the several polymer blocks are then achieved by adding the two kinds of complexing agents as needed.

The process described above may be operated on a living polymer that already contains one or more diene polymer blocks. A conjugated diene polymer block having low 1,2 or 3,4 (high 1,4) microstructure may be prepared first in inert hydrocarbon solvent, then a polar substance may be added before producing a conjugated diene polymer block of moderate to high 1,2 or 3,4 microstructure, then the second complexing agent may be added before producing a third polymer block. The living block copolymer produced by such means may be inactivated and recovered or it may be coupled according to technique known to the art.

Polar substances suitable for complexing with the lithium ion of a growing polydienyl lithium system in order to direct entering monomers into the 1,2 configuration include ethers, such as diethyl ether or tetrahydrofurane or dimethoxyethane, or thioethers such as dimethyl sulfide, tertiary aliphatic amines such as triethylamine or particularly tetramethylethylenediamine, or alkyl phosphoramides, such as hexamethylphosphoramide. The amounts of polar substance required will range from about 0.5 mole to about 50 moles of polar substance per mole of lithium alkyl, depending on the percentage of 1,2 microstructure desired in the diene polymer block and on the effectiveness of the polar substance. Even small amounts of polar substance will increase 1,2 microstructure levels to have 15–20%, compared to 5–10%, 1,2 content produced in the absence of polar substance.

Suitable second complexing agents that will complex with the above-mentioned polar substances, so that diene monomer entering the growing chain is no longer directed into a 1,2 configuration, are the dihydrocarbyl, e.g., dialkyl, diaryl, dialkaryl and diaralkyl compounds of elements of Group II of the Periodic Table, that is compounds of zinc, cadmium, magnesium, calcium, strontium and barium. Examples of preferred species are dialkyl zinc and dialkyl magnesium compounds, such as diethyl zinc, dimethyl magnesium, dibutyl magnesium and dimethyl cadmium. The amounts of these second complexing agents required are generally from about 0.5 mole to about 20 moles per mole of polar substance previously added. The preferred range is from about 1 mole to about 4 moles of second complexing agent per mole of polar substance. Amounts of second complexing agent to be added may be chosen, if desired, so that small amounts of the polar compound present are not complexed, in which case percentages of 1,2 microstructure up to about 20% may be achieved in subsequent polymerization. Also, some of the second complexing agents do not form as "tight" a complex with the polar compound, so that 1,2 microstructure up to about 20% may be formed during subsequent polymerization.

Polymerization is conducted under conditions known in the prior art for lithium alkyl polymerization of dienes. Generally, temperatures of 20° C. to 70° C. are used for periods of 0.1 to 5 hours when producing any particular block of the copolymer. The reactions are carried out in a closed pressure vessel under the autogenous pressure of the diene monomer and/or the solvent. The polymeric product may be recovered by hot water coagulation in a stirred vessel or by precipitation with a non-solvent.

A preferred three-block copolymer may be made that has terminal blocks that are low in 1,2 microstructure and a middle block that has a moderate 1,2 content. This is carried out, for example, by initial polymerization of diene in the absence of structure modifier to form a first block low in 1,2 content; injection of a modifier and continuation of polymerization to form a second block having higher 1,2 content; then adding the complexing agent and continuing polymerization to form a third block having low 1,2 content.

The polymers of this invention may be compounded further with oils, fillers, antioxidants, stabilizers, antiblocking agents and other rubber and plastics compounding ingredients without departing from the scope of this invention. These additives are often present in commercial products for various purposes, especially to reduce costs.

The vulcanizing agents found in commercial rubbers are useful in improving the properties of the unsaturated conjugated diene block copolymers of this invention. While useful in some applications requiring elastomeric properties, these precursor polymers have rather low strength and low resistance to deformation; thy require cross-linking to achieve the high strength needed for commercial acceptance in many uses.

The products of this invention are suitable, as produced or after vulcanization, for most purposes where rubbers are employed, such as in coatings, sheets, mechanical goods, latices, paints, thermoformed articles, insulations, and the like, and may be processed by normal rubber techniques. They may be compounded, with or without admixture with conventional ealstomers, using rubber compounding ingredients, and then extruded or molded by compression or injection or blowing. The compositions may also be cast from solvents. The compositions so produced may be vulcanized by conventional techniques.

The following examples illustrate the manner in which the invention may be carried out. The examples are for the purpose of illustration, and the invention is not to be regarded as limited to any of the specific polymers, compounds or conditions recited. Unless otherwise specified, parts disclosed in the examples are parts by weight.

EXAMPLE I

This example demonstrates the sequential preparation of a "heteromicroblock homopolymer," described along with other copolymers in this application and claims by the term block copolymer, from butadiene only. The terminal blocks of the product had 82% 1,2 microstructure and interior blocks had about 28% 1,2 microstructure. The rest of the structure in each block was cis 1,4 or trans 1,4. The two-block copolymer was coupled with phenyl benzoate.

A solution of butadiene (1.0 moles) in cyclohexane was initiated with .54 millimoles of sec-butyl lithium complexed with .54 millimoles of tetramethylethylenediamine. After 24 minutes of reaction at 25–30° C., sample I of the polymer was withdrawn and had a number average molecular weight of 27,000 and a microstructure of 82% 1,2 by nuclear magnetic resonance spectrometric analysis. The yellow solution was titrated with zinc diethyl until colorless, requiring .63 millimoles of zinc diethyl, or 1.26 moles per mole of tetramethylethylenediamine. At this time, the temperature was raised to 50° C., and polymerization was continued for 175 minutes longer to consume the butadiene present. Sample II was removed at this point. The two-block copolymer had an average molecular weight of 86,000 and a 1,2 microstructure of 45%. By difference between Sample I and Sample II, the 1,2 microstructure of the polymer block formed *after* adding zinc diethyl was about 28%.

An amount of phenyl benzoate (0.2 milliequivs) was added at 25° C. that was equivalent to the anionic chain ends present. The temperature was raised to 50–73° C. during 70 minutes. The coupled block compolymer (Sample III) now had an average molecular weight of 140,000; coupling efficiency was 90% by gel permeation chromatographic analysis of the product.

EXAMPLE II

Two-block and three-block polymers are made in which the terminal blocks have low 1,2 microstructure and the interior blocks made from a different diene have moderate to high 1,2 microstructure.

Using techniques known to the art, a cyclohexane solution of 1.0 moles of butadiene is initiated with 2.16 millimoles of sec-butyl lithium and is allowed to polymerize to an average molecular weight of 25,000; the 1,2 content of this polymer block is 8%. At this point 1.1 millimoles of tetramethylethylenediamine is added to complex with polybutadienyl lithium and pretitrated isoprene monomer is added and polymerization is continued to produce an isoprene polymer block of 100,000 average molecular weight and about 50% 3,4 microstructure. The isoprene is essentially consumed at this point.

The solution of active two-block polymer is divided into two portions. One portion is coupled with phenyl benzoate to produce a three-block copolymer having 8% 1,2 polybutadiene microstructure in the exterior blocks. Enough zinc diethyl is added to the second portion of active two-block copolymers to complex with the tetramethylethylenediamine (i.e., about 1.25 moles/mole of diamine), then sufficient additional pretitrated butadiene is added to form a third polymer block of 25,000 average molecular weight. This final butadiene polymer block contains low 1,2 microstructure because the influence of the tetramethylethylenediamine on microstructure is destroyed by its tight complex with zinc diethyl.

Both the coupled polymer and the three-block polymer are milled with 50 phr. HAF carbon block, NOBS accelerator and sulfur and vulcanized by heating in a vulcanizing press at 145° C. The products are snappy high strength rubbers.

It will be understood that the process described hereinbefore also is applicable to processes in which the polymerization initiator has a functionality greater than 1, e.g. dilithiostilbene.

I claim as my invention:

1. In the process for the formation of a block copolymer wherein a conjugated diene is polymerized in the presence of a lithium alkyl initiator, the steps comprising:
   (a) polymerizing at least one conjugated diene polymer in the presence of a microstructure modifier of the group consisting of ethers, thioethers, tertiary amines and hexaalkylphosphoramides whereby a first diene polymer block having more than about 25% 1,2 or 3,4 microstructure is formed,
   (b) thereafter injecting 0.5–20 moles, per mole of modifier of at least one dihydrocarbyl of a metal of the group consisting of zinc, cadmium, magnesium, calcium, strontium, and barium whereby a complex thereof is formed with said modifier, and
   (c) continuing polymerizing a second conjugated diene polymer block in the presence of the complexed modifier, said block having less 1,2 or 3,4 microstructure than the first block.

2. The process according to claim 1 wherein the diene used in steps (a) and (c) is butadiene.

3. The process according to claim 1 wherein the diene used in steps (a) and (c) is isoprene.

4. The process according to claim 1 wherein two different dienes are employed.

5. The process according to claim 1 wherein the diene used in steps (a) and (c) is butadiene and the dihydrocarbyl metal is dialkyl zinc, the dialkyl zinc being added in an amount between about 1 mol and 4 mols per mol of modifier.

6. A process according to claim 1 where step (a) is preceded by a polymerization of an initial polymer block in the absence of modifier.

7. A process according to claim 1 wherein step (b) is followed by a polymerization of a final polymer block in the presence of added modifier.

8. A process according to claim 1 wherein the modifier is tetramethylethylene diamine.

9. A process according to claim 1 wherein, subsequent to step (c), a coupling agent is injected whereby at least a portion of the block copolymer molecules are coupled.

References Cited
UNITED STATES PATENTS

| | | | |
|---|---|---|---|
| 3,140,278 | 7/1964 | Kuntz | 260—94.2 M |
| 3,278,508 | 10/1966 | Kahle et al. | 260—94.3 |
| 3,301,840 | 1/1967 | Zelinski | 260—94.2 M |
| 3,716,495 | 2/1973 | Hsieh | 260—94.3 X |

JOSEPH L. SCHOFER, Primary Examiner

W. F. HAMROCK, Assistant Examiner

U.S. Cl. X.R.
260—94.2 M, 94.3